Oct. 24, 1950   J. KNIVETON   2,527,430
HEATING LIQUIDS IN VESSELS
Filed April 18, 1946
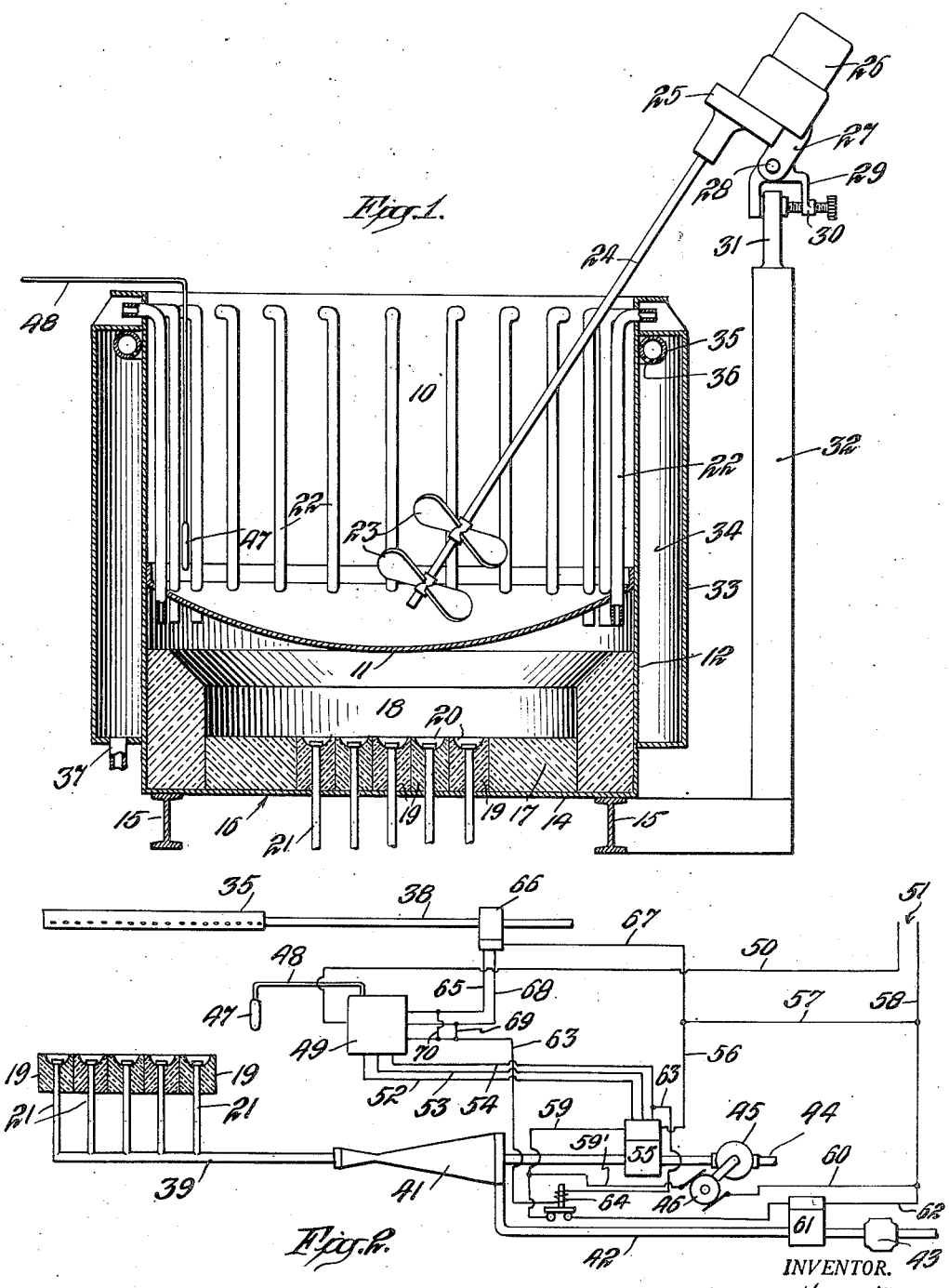
INVENTOR.
James Kniveton
BY
E H Fenander
his ATTORNEY Patented Oct. 24, 1950

2,527,430

UNITED STATES PATENT OFFICE 2,527,430

HEATING LIQUIDS IN VESSELS

James Kniveton, Wyncote, Pa., assignor to Selas Corporation of America, Philadelphia, Pa., a corporation of Pennsylvania Application April 18, 1946, Serial No. 663,004

9 Claims. (Cl. 257—4)

This invention is concerned with heating liquid in vessels.

It is an object of the invention to provide an improvement for heating liquids in vessels when a combustible fluid fuel is utilized as a source of heat, particularly to effect more uniform heating throughout a body of liquid contained in a vessel. I accomplish this by effecting combustion of a combustible fluid fuel at a region below the bottom of the vessel so as to apply heat to the bottom of the liquid body contained therein, and flowing or venting the heated gases generated and developed by such combustion in thermal exchange relation with the liquid body while out of physical contact with the liquid and the atmosphere. More particularly, the heated gases flow in thermal exchange relation with the body of liquid in such a manner that heat will be applied at distributed points about the outer portion of the liquid body throughout substantially its entire depth.

It is another object of the invention to provide an improvement for maintaining the body of liquid contained in a vessel at a desired temperature or temperature range, particularly for dissipating heat from the liquid body when the temperature thereof rises above a desired or definite value. I accomplish this by flowing a cooling agent in heat exchange relation with the vessel when cooling of the liquid body is desired.

Further, in order to provide several stages of cooling, provision may be made to effect initial cooling of the liquid body by shutting off the supply of combustible fluid fuel and delivering air alone to the region at the bottom part of the vessel. Heat from the bottom part of the vessel is given up to such air which effects further cooling of the liquid body by flowing in thermal exchange relation therewith in paths of flow at the sides of the vessel. Such initial cooling by the air may be supplemented by additional cooling by the cooling agent, as previously explained, when this becomes necessary.

The above and other objects and advantages of the invention will be more fully understood from the following description taken in conjunction with the accompanying drawings forming a part of this specification, and of which Fig. 1 is a vertical sectional view more or less diagrammatically illustrating apparatus embodying the invention for heating a vessel adapted to contain a body of liquid therein; and Fig. 2 is a view diagrammatically illustrating a control system embodying the invention for controlling the heating and cooling of the vessel of Fig. 1 to maintain the liquid body in the vessel at a desired temperature or temperature range.

In Fig. 1 is shown heating apparatus embodying the invention comprising a vessel 10 adapted to contain a body of liquid to be heated. The vessel 10 is formed with a curved bottom 11 which is secured at its peripheral edge portion to a cylindrical-shaped side wall 12. The side wall 12 extends below the bottom 11 and, together with a base plate 14 which rests upon a suitable foundation 15, forms an outer shell or casing for a furnace construction or setting 16 for applying heat to the bottom 11 of the vessel. The furnace setting 16 comprises a refractory lining 17 including a horizontal refractory wall section formed upon the base plate 14 and a vertical refractory wall section formed about the bottom part of the side wall 12.

The refractory lining 17, an intermediate portion of the side wall 12 and the bottom 11 of the vessel form an enclosed furnace chamber 18 which is adapted to be fired to an elevated temperature in any suitable manner. In the illustrated embodiment the furnace chamber 18 is fired by a plurality of gas burners 19 which are incorporated in the bottom wall section of the refractory lining 17 and to which a combustible gas mixture is supplied through conduits 21.

In order to provide a compact and small furnace chamber 18, the burners are preferably of a "short flame" type, so that impingement of the burner flames against the bottom 11 is avoided. Although not to be limited thereto, the burners 19 may be of a type like that disclosed in Hess Patent No. 2,215,079, in which combustion of the gas mixture may be accomplished substantially completely in the cup-shaped cavities 20, whereby a large fraction of the heat generated is converted to radiant heat which is projected from the wall surfaces of the cavities to the bottom 11 of the vessel. Such radiant heating of the bottom of the vessel 10 is augmented by convection heating by the heated products of combustion and radiant heating from the refractory lining 17 which is heated to incandescence by the heated products of combustion sweeping over the inner surface of the lining.

In accordance with the invention, in order to promote uniform heating of a body of liquid contained in the vessel 10, the heated gases in the furnace chamber 18 are effectively utilized to apply heat substantially uniformly about the outer part of the liquid body while heat is being applied to the bottom 11 of the vessel. I accomplish this by providing a plurality of vertical tubes 22 which are distributed about the inside of the vessel 10 alongside of each other. The tubes 22 are disposed relatively close to the side wall 12 and spaced therefrom to form a series of passages each of which is adapted to be completely enveloped by the body of liquid contained in the vessel 10.

The tubes 22, which may be referred to as vent tubes, extend downwardly through openings in the bottom 11 and the lower open ends thereof terminate a short distance above the vertical refractory wall section of the refractory lining 17. The heated gases, which are generated and developed by combustion of the combustible gas mixture supplied to the burners 19, pass upwardly through the tubes 22 and discharge through the upper outturned ends thereof which extend through openings in the side wall 12. In this way the heated products of combustion are effectively utilized to apply heat substantially uniformly about the outer part of the liquid body throughout its entire depth, so that liquid at the regions adjacent to the side wall 12 may be heated at a rate approaching the rate at which heating of liquid is effected adjacent to the bottom 11 of the vessel. The heated gases passing over the outer surface of the bottom 11 and flowing through the vent tubes 22 are out of physical contact with the liquid in the vessel 10 and the atmosphere.

When a fused salt or salt mixture is being heated in a vessel like the vessel 10, such a mixture may solidify when heating of the vessel is stopped. When heating of the vessel is resumed and heat is applied only to the bottom of the vessel, there is always the danger of the salt or salt mixture melting very rapidly in the bottom part of the vessel while the top part thereof remains in a solid state. In such case there is always the likelihood of the vessel failing at the bottom part thereof by reason of bulging that occurs due to expansion of the salt or salt mixture in changing from solid to liquid phase.

The danger and likelihood of vessel failure is completely overcome in accord with the instant invention by flowing the heated products of combustion in confined paths of flow through the vent tubes 22 to heat the outer portion of the solidified body which may be held in the vessel 10. Since such heating of the outer part of the solid matter is effected throughout its depth and at a rate approaching the rate at which heat is applied to the bottom part adjacent to the bottom 11, the vessel 10 will not be subjected to excessive localized pressures likely to cause vessel failure.

In order to promote uniform heating of a body of liquid in the vessel 10, an agitator of any well known type may be employed to circulate the liquid about the tubes 22. As shown in Fig. 1, such an agitator may comprise a plurality of suitable propeller blades 23 fixed to an elongated shaft 24 driven through speed reducing gearing 25 from an electric motor 26 connected in any suitable manner (not shown) to a source of electrical supply.

The speed reducing gearing 25 and motor 26 are carried on a support 27 which is angularly adjustable at 28 on a bracket 29. The bracket 29 in turn is angularly adjustable at 30 on a vertical support 31, such angular adjustment being in a plane transverse to the adjustment of bracket 27, so that the blades 23 may be adjusted to any desired position within the vessel 10. The vertical support 31 may be fixed to the upper part of framework 32 which is secured at its lower end to the foundation 15.

When the liquid contained in the vessel 10 is to be heated to a high temperature, the bottom 11, side wall 12 and tubes 22 may be formed of a suitable alloy steel, such as stainless steel, for example. Similarly, the blades 23 and driving shaft 24 therefor may also be formed of such an alloy steel to withstand the temperature at which the body of liquid is maintained in the vessel 10.

The vessel 10 when formed of such alloy steel is especially useful as a so-called "salt quench tank" for quenching and cooling articles of ferrous metal from an elevated critical hardening temperature to effect hardening of the articles. In such case the liquid body, which may comprise a fused salt or salt mixture, is maintained at a temperature considerably above the ambient temperature but below the critical hardening range. By keeping the fused salt or salt mixture at a temperature in the neighborhood of 350° to 600° F., for example, and immersing in such liquid body articles of ferrous metal which have previously been heated to the critical hardnening temperature of about 1500° F. or higher, for example, the quenching and cooling of articles is carried out at a slower rate than when the articles are cooled in a single step from the critical hardening temperature substantially to the ambient air temperature.

After a uniform temperature is established throughout the articles while immersed in the fused salt bath, the articles may be removed therefrom and air cooled. Such quenching procedure is commonly referred to as a "delayed quench" or an "interrupted quench," and is often employed for quenching and cooling alloy steels to produce certain physical characteristics in steel articles that cannot be obtained when quenching is accomplished in a single step as, for example, by immersing the heated articles directly in a body of unheated quenching oil or other suitable quenching medium.

In employing the apparatus of Fig. 1 for interrupted quenching of articles of ferrous metal, it is of considerable importance to maintain the quenching liquid at a definite or desired temperature or temperature range. After the body of liquid contained in the vessel 10 has initially been heated to such a definite temperature and heated articles of ferrous metal are immersed therein to effect hardening of the articles, the temperature of the body of liquid tends to rise and provision must be made for dissipating heat therefrom to keep the body of liquid at the desired temperature or temperature range.

In the embodiment illustrated this is accomplished by providing an annular-shaped metal shell 33 about the vessel 10 which cooperates with the side wall 12 to form an elongated vertical chamber 34. The chamber 34 extends downwardly from a region immediately beneath the upper outturned ends of the vent tubes 22 and at its lower end overlies the side refractory wall section of the refractory lining 17.

A ring-shaped manifold 35 within the chamber 34 is fixed in any suitable manner to the upper part of shell 33. A suitable cooling agent, such as water, for example, is delivered from a source of supply to the manifold 35 which is formed with a series of openings 36 for directing the cooling agent against the outer surface of the side wall 12. The cooling agent trickles and flows downwardly over the side wall 12 and takes up heat from the liquid body in the vessel 10. Liquid is discharged from the chamber 34 through an outlet connection 37 and may be recirculated after first passing through a suitable cooling tower (not shown).

A suitable control system may be provided for controlling the supply of the combustible gas mixture to the burners 19 and the supply of the cooling agent to the manifold 35, responsive to the temperature of the liquid in the vessel 10, so as to maintain the liquid body at the desired temperature or temperature range. Such a control system is more or less diagrammatically shown in Fig. 2 in which the cooling agent is delivered from a source of supply through a conduit 38 to the manifold 35, and the combustible gas mixture is delivered to the burners 19 through conduits 21 and a main supply conduit 39 which receives a complete gas and air mixture from a mixing device 41. A combustible gas is supplied to the mixing device 41 from a suitable source of supply through a conduit 42 in which is provided a gas pressure regulator 43, and combustion supporting air is supplied to the mixing device through a conduit 44 in which is provided a blower 45 arranged to be driven by an electric motor 46.

The control system of Fig. 2 for controlling the supply of combustible gas, combustion supporting gas and cooling agent, responsive to a thermal element 47 positioned within the vessel 10, is so constructed and arranged that, when the liquid body is below a definite temperature, the supply of cooling agent to the manifold 35 is shut off and only a mixture of combustible gas and combustion supporting air is delivered to the burners 19.

When the temperature of the body of liquid rises above such definite value, cooling agent is not immediately supplied to the manifold 35. The desired dissipation of heat from the liquid body in the vessel 10 is effected in several steps and in the first step the supply of combustible gas through the conduit 42 is shut off and air alone is supplied to the burners 19 by the blower 45. Such air, which is at the ambient temperature, immediately effects cooling of the burner cavities 20 and refractory lining 17 to reduce the heating of vessel 10 by radiant heat. The air delivered by the burners 19 into the furnace chamber 18 also sweeps over the bottom 11 of the vessel 10 and passes upwardly through the vent tubes 22, thereby taking up heat from the liquid body in the vessel.

In the event the air supplied to the burners 19 is insufficient to maintain the body of liquid in the vessel 10 at the desired temperature or temperature range and the temperature of the liquid in the vessel tends to rise further, cooling agent is then supplied to the manifold 35 through the conduit 38 to initiate the second cooling step so as to maintain the liquid body at the desired temperature.

The above described operation of the apparatus of Fig. 1 is accomplished by providing the thermal bulb 47 in the vessel 10 which is connected by a tube 48 to a suitable control device 49. The thermal bulb 47 and tube 48 may form part of an expansible fluid thermostat which is charged with a suitable volatile fluid for operating the control device 49 to complete certain electrical circuits with changes in temperature of the liquid in the vessel 10. Control devices of the general character of control device 49 are well known in the art and further description thereof is not believed necessary for an understanding of the invention described herein.

As shown in Fig. 2, the control device 49 is connected by a conductor 50 to one side of a source of electrical supply 51. The control device 49 is connected by conductors 52, 53 and 54 to an electromagnetically operable valve 55 which in turn is connected by conductors 56, 57 and 58 to the opposite side of the source of electrical supply. In the event the temperature of a liquid in vessel 10 falls below a definite value, the conductor 52 is energized to complete a circuit for the valve 55. With a further decrease in temperature of the liquid in vessel 10 the circuit for the valve 55 is completed by conductor 53, and with a still further decrease in temperature of the liquid the circuit for valve 55 is completed by the conductor 54. The extent to which the valve 55 opens is dependent upon the fall in temperature of the liquid below the definite value, the opening of the valve being smallest when conductor 52 is energized and greatest when conductor 54 is energized.

When valve 55 is energized by any one of conductors 52, 53 and 54, a circuit is also completed for the motor 46, such circuit including conductors 59 and 59' connecting the valve 55 to one terminal of the motor whose opposite terminal is connected by conductors 60 and 58 to the source of electrical supply. Energization of the motor 46 will start the blower 45 so that combustion supporting air will be delivered to the mixing device 41 through the conduit 44, the rate at which such air is delivered being dependent upon the extent to which valve 55 is opened.

When valve 55 is energized a circuit is also completed for an electromagnetically operable valve 61 provided in the combustible gas conduit 42. This circuit is completed from the valve 55 by conductor 59 which is connected to one terminal of valve 61 whose opposite terminal is connected by conductors 62 and 58 to the source of electrical supply. The gas valve 61 differs from the air valve 55 in that it simply moves to a single open position when energized.

The mixing device 41 is diagrammatically shown as being of an inspirator type to which combustion supporting air is supplied under pressure through the conduit 44 by the blower 45. The air supplied to the device 41 inspirates combustible gas into the device from the conduit 42 when the valve 61 is open. The gas pressure regulator 43 is preferably adjusted to reduce the pressure of the combustible gas in conduit 42 substantially to atmospheric pressure. The rate of flow of combustible gas into the mixing device 41 is dependent upon the pressure and rate at which combustion supporting air is supplied to the device, so that a substantially complete combustible mixture is always provided for the burners 19 by the mixing device.

Hence, when the liquid body contained in the vessel 10 is initially being heated and the thermal bulb 47 calls for the maximum amount of heat, conductor 54 is energized by the control device 49 to complete circuits for the valves 55 and 61. Since the valve 55 is energized through the conductor 54, such valve will open to its maximum open position and deliver combustion supporting air at the maximum rate to the mixing device 41. Under these conditions the mixing device 41 supplies the combustible gas mixture at the maximum rate to the burners 19 so that the burners will operate at maximum capacity to effect heating of the vessel 10 and the body of liquid contained therein.

As the temperature of the liquid body rises and approaches the desired or definite value, the control device 49 acts to complete a circuit for the valve 55 through the conductor 53. When this occurs the gas valve 61 will remain in its single open position and the air valve 55 will close slightly so that combustion supporting air will be supplied at a reduced rate to the mixing device 41. Combustible gas will be inspirated into the device 41 and mix with the air and such mixture will be delivered to the burners 19 at a reduced rate so that the burners will operate at less than maximum capacity.

Upon further increase in temperature of the liquid body as it approaches the desired or definite value, the control device 49 acts to complete a circuit for the valve 55 through the conductor 52. When this occurs the gas valve 61 remains energized and in its open position, and valve 55 will close further so that the combustible gas mixture will be supplied at a further reduced rate from the mixing device 41. Under these conditions the gas mixture will be supplied at the minimum rate to the burners 19 and the latter will operate at minimum capacity to effect heating of the vessel 10 and the body of liquid contained therein.

When the temperature of the liquid in the vessel 10 is at the desired or definite value, the control device 49 acts to deenergize the conductors 52, 53 and 54, thereby deenergizing and closing the electromagnetically operable valves 55 and 61 to shut off the supply of combustible gas and combustion supporting air to the mixing device 41. Deenergization of the valve 55 opens the circuit for the motor 46 to shut down the blower 45.

In the event the temperature of the liquid in the vessel 10 rises above the desired value the control device 49, in response to the expansible fluid thermostat of which the thermal bulb 47 forms a part, acts to energize conductor 63. Since the conductor 63 is connected to conductor 54, this will energize the valve 55 so that air can be supplied at the maximum rate through the conduit 44. When the valve 55 is energized a circuit is also completed for motor 46 by the conductor 59 to render the blower 45 operative.

Since the coil of relay 64 is connected in conductor 63, the energization of this conductor opens the normally closed contacts of the relay so that, even though the conductor 54 is energized to complete a circuit for the air valve 55, the conductor 59 will be opened and the gas valve 61 will remain deenergized and closed. Under these operating conditions only air will be supplied by the blower 45 to the burners 19. Such air, as explained above, effects cooling of the burner cavities 20 and refractory lining 17 to reduce the radiant heat received by the bottom 11. In addition, the cooling air supplied to the furnace chamber 18 through the burners 19 sweeps over the bottom 11 of the vessel and passes upwardly through the vent tubes 22 and takes up heat from the liquid body in the vessel.

When the air supplied to the furnace chamber 18 is insufficient to lower the temperature of the liquid in the vessel 10 to the desired value and its temperature continues to rise, the control device 49 acts to energize conductor 65 which is connected to an electromagnetically operable valve 66 provided in the conduit 38. The circuit for valve 66 is completed by conductors 67, 57 and 58 to the source of electrical supply 51. The energization of the valve 66 by conductor 65 opens such valve to an intermediate open position so that cooling agent will be supplied to the manifold 35. In the event the temperature of the liquid body in the vessel 10 still continues to rise above the desired value, the control device 49 acts to energize conductor 68 so that a circuit will be completed for valve 66 whereby the latter will move from its intermediate open position to its wide open position to increase the rate at which cooling agent is supplied to the manifold 35.

Cross connections 69 and 70 are provided from conductors 68 and 65 to conductor 63 so that valve 55 will remain in its wide open position and the blower 45 will continue to operate during the periods when cooling agent is being supplied to the manifold 35. In this way cooling air will be supplied to the furnace chamber 18 and pass through the vent tubes 22 while cooling agent is flowing downwardly on the outer surface of the side wall 12 from the manifold 35, thereby effecting rapid cooling of liquid in the vessel 10 to cause its temperature to fall to the desired or definite value.

In view of the foregoing, it should now be understood that by providing the vent tubes 22, the heated gases passing therethrough from the furnace chamber 18 promote uniform heating of a body of liquid adapted to be held in the vessel 10, so that the outer portion of the liquid body throughout its depth may be heated at approximately the same rate as the part of the liquid body adjacent to the bottom 11 of the vessel 10. Heat transfer is effected to the liquid by conduction through the walls of the tubes 22 from the heated gases passing through the latter. Uniform heating of the liquid body is further promoted by forced circulation of the liquid in the vessel 10 by the propeller blades 23. Moreover, the control system described and shown in Fig. 2 effectively maintains the liquid in the vessel 10 at the desired temperature or temperature range.

While only a single row of burners 19 is shown in the apparatus of Fig. 1, it should be understood that several rows of burners may be provided and arranged in any desirable manner to effect the desired heating at the bottom 11 of the vessel 10. Moreover, the burners may be arranged in any other suitable manner for firing the furnace chamber 18 and may differ from the burners 19 which are only illustrative of one manner of practicing the invention.

In the control system of Fig. 2, no provision is shown for igniting the burners 19 following a shut down period. However, such ignition devices are well known in the art and it should be understood that in practice provision would normally be made to include an automatic ignition device for the burners 19.

While a single embodiment of the invention has been shown and described, such variations and modifications are contemplated which fall within the true spirit and scope of the invention, as pointed out in the following claims.

What is claimed is:

1. In the art of heating and cooling a body of liquid in a vessel, the improvement which comprises burning fluid fuel beneath the vessel in a space partly defined by the bottom of the vessel and causing the heated gases generated and developed by said combustion to flow in one or more paths in thermal exchange relation with the body of liquid and out of physical contact with the liquid and the atmosphere when heating of the liquid is desired, and delivering a gaseous cooling medium to the space and causing such cooling medium to flow in said one or more paths when cooling of the liquid is desired.

2. In the art of heating and cooling a body of liquid in a vessel having a bottom and a side wall extending upwardly therefrom, the improvement which comprises burning fluid fuel beneath the vessel in a space partly defined by the bottom of the vessel and causing the heated gases generated and developed by said combustion to flow in thermal exchange relation with the body of liquid and out of physical contact with the liquid and the atmosphere so as to apply heat to the body of liquid substantially about the entire outer portion thereof adjacent the side wall when heating of the liquid is desired, and causing a liquid cooling agent to flow along the outer surface of the side wall when cooling of the liquid in the vessel is desired.

3. In the art of heating and cooling a body of liquid in a vessel, the improvement which comprises burning fluid fuel so as to produce heated gases at an elevated temperature and causing such heated gases to flow in one or more paths in thermal exchange relation with the body of liquid and out of physical contact with the liquid and the atmosphere when heating of the liquid is desired, causing a gaseous cooling medium to flow in said one or more paths when cooling of the body of liquid is desired, and causing a liquid cooling agent to flow in thermal exchange relation and out of physical contact with the body of liquid when additional cooling of the liquid in the vessel is desired.

4. Heating and cooling apparatus comprising a vessel adapted to hold a body of liquid, said vessel having a bottom and a side wall extending upwardly therefrom, structure including said bottom providing a closed furnace chamber, said bottom forming a roof for the chamber, gas-fired burner means to effect combustion of a mixture of a combustible gas and air for firing the chamber to an elevated temperature, means providing a passage for venting heated gases from the chamber, said last-mentioned means being so constructed and arranged that the heated gases vented through the passage flow in heat exchange relation with the body of liquid, a device for mixing the combustible gas and air, supply means for delivering the combustible gas and air to said device and the mixture from the latter to said burner means, cooling means for flowing a liquid cooling agent in thermal exchange relation and out of physical contact with the body of liquid, conduit means for supplying the cooling agent to said cooling means, and sequentially operated means for controlling the supply of the gas mixture to said burner means by said delivery means and the supply of cooling agent to said cooling means through said conduit means in response to the temperature of said vessel.

5. Heating and cooling apparatus comprising a vessel adapted to hold a body of liquid, said vessel having a bottom and a side wall extending upwardly therefrom, structure including said bottom providing a closed furnace chamber, said bottom forming a roof for the chamber, gas-fired burner means to effect combustion of a mixture of a combustible gas and air for firing the chamber to an elevated temperature, means providing one or more passages for venting heated gases from the chamber, said last-mentioned means being so constructed and arranged that the heated gases vented through the passage or passages flow in heat exchange relation with the body of liquid, a device for mixing the combustible gas and air, supply means for delivering the combustible gas and air to said device and the mixture from the latter to said burner means, cooling means for flowing a liquid cooling agent in thermal exchange relation and out of physical contact with the body of liquid, conduit means for supplying the cooling agent to said cooling means, and temperature responsive means for shutting off the supply of combustible gas to said burner means by said delivery means when the body of liquid in the vessel reaches a desired temperature and permitting flow of cooling agent to said cooling means through said conduit means when the body of liquid in the vessel rises above the desired temperature.

6. Heating and cooling apparatus comprising an open vessel having a bottom and side walls extending upwardly therefrom, structure including said bottom forming a closed combustion chamber, means to supply a combustible fuel mixture to said chamber to be burned therein, vent means for the products of combustion forming a plurality of passages passing through said bottom and adjacent to said side walls and through said side walls near the top thereof to the atmosphere, structure forming a chamber around said side walls, means located in said chamber to supply a cooling medium to said side walls, means responsive to the temperature of material in said vessel, means to control the supply of fuel, means to control the supply of cooling medium, and means operated by said temperature responsive means to adjust said two control means to reduce the supply of fuel and then increase the supply of cooling medium as the temperature of the material in said vessel increases.

7. Heating and cooling apparatus comprising a vessel adapted to hold a body of liquid, said vessel having a bottom and side walls extending upwardly therefrom, structure including said bottom forming a closed combustion chamber formed below said vessel, burners located in said chamber, means for supplying gas to said burners, means for supplying air to said burners, the gas and air burning in said combustion chamber, vent means extending through the bottom of said vessel and through the liquid therein to the atmosphere through which the products of combustion pass, means responsive to the temperature of the liquid in said vessel, and mechanism operated by said last-mentioned means to cut off the supply of gas to said burners in response to increase in the temperature of said liquid, the air continuing to flow to said burners to cool them and the combustion chamber and through said vent means to cool said liquid.

8. Heating apparatus comprising an open vessel having a bottom and side walls extending upwardly therefrom, structure including said bottom forming a closed combustion chamber, burner means through which a combustible fuel mixture is supplied to said chamber to heat said vessel, a plurality of venting tubes for the products of combustion, said tubes being located around the inside of said side walls of said vessel with their lower ends extending through said bottom and into said combustion space and the upper ends of said tubes extending through said side walls near the top thereof whereby material near the side walls of said vessel will be heated by said tubes, structure forming a chamber around said side walls below the upper ends of said tubes, and means located in said chamber to supply a cooling medium to said side walls.

9. Heating apparatus comprising an open vessel having a bottom and side walls extending upwardly therefrom, structure including said bottom forming a closed combustion chamber, means to supply a combustible fuel mixture to said chamber to be burned therein, vent means for the products of combustion forming a plurality of passages passing through said bottom and adjacent to said side walls and through said side walls near the top thereof to the atmosphere, structure forming a chamber surrounding said side walls, and means located in said chamber to supply a cooling medium to said side walls.

JAMES KNIVETON.

REFERENCES CITED

The following references are of record in the file of this patent:

UNITED STATES PATENTS

| Number | Name | Date |
|---|---|---|
| 461,867 | Flanders | Oct. 27, 1891 |
| 747,713 | Hopkins | Dec. 22, 1903 |
| 762,910 | Junkers | June 21, 1904 |
| 1,019,164 | Krohn et al. | Mar. 5, 1912 |
| 1,594,131 | Stewart | July 27, 1926 |
| 1,835,611 | Page et al. | Dec. 8, 1931 |
| 1,923,639 | O'Dowd | Aug. 22, 1933 |
| 1,961,231 | Maier | June 5, 1934 |
| 2,228,088 | Roth | Jan. 7, 1941 |
| 2,317,480 | Peters | Apr. 27, 1943 |